US011573071B2

(12) United States Patent
Wang

(10) Patent No.: US 11,573,071 B2
(45) Date of Patent: Feb. 7, 2023

(54) IRREGULAR OBJECT LENGTH MEASURING INSTRUMENT

(71) Applicant: Shenzhen Test Friends Technology Co., LTD, Guangdong (CN)

(72) Inventor: Jincheng Wang, Henan (CN)

(73) Assignee: Shenzhen Test Friends Technology Co., LTD, Shenzhen (CN)

( * ) Notice: Subject to any disclaimer, the term of this patent is extended or adjusted under 35 U.S.C. 154(b) by 0 days.

(21) Appl. No.: 17/465,842

(22) Filed: Sep. 2, 2021

(65) Prior Publication Data
US 2022/0205771 A1 Jun. 30, 2022

(30) Foreign Application Priority Data
Dec. 25, 2020 (CN) .......................... 202011560962.4

(51) Int. Cl.
*G01B 3/12* (2006.01)
*G01B 5/02* (2006.01)
*G01B 5/00* (2006.01)

(52) U.S. Cl.
CPC .............. *G01B 5/02* (2013.01); *G01B 5/0004* (2013.01)

(58) Field of Classification Search
CPC ....................................................... G01B 3/12
USPC .................. 33/734, 735, 772, 773, 779, 780
See application file for complete search history.

(56) References Cited

U.S. PATENT DOCUMENTS

| 6,574,876 | B2* | 6/2003 | Takeuchi | B62D 15/02 33/1 PT |
| 7,089,679 | B2* | 8/2006 | Brown | G01B 3/12 33/775 |
| 7,363,826 | B2* | 4/2008 | Sano | G01D 11/245 73/862.328 |
| 7,774,945 | B2* | 8/2010 | Sano | G01D 11/245 73/117.02 |
| 8,310,227 | B2* | 11/2012 | Lai | G01B 3/12 33/780 |
| 8,510,962 | B2* | 8/2013 | Lee | B62D 15/0215 33/1 PT |
| 8,688,345 | B2* | 4/2014 | Boughtwood | B60L 15/2009 318/560 |
| 8,810,239 | B2* | 8/2014 | Shin | B62D 15/0215 72/337 |
| 10,473,473 | B2* | 11/2019 | Shi | G01B 3/12 |
| 11,340,055 | B2* | 5/2022 | Zhang | G01B 3/12 |
| 2018/0073848 | A1* | 3/2018 | Wang | G01B 3/12 |
| 2021/0239445 | A1* | 8/2021 | Zhang | G01B 3/12 |

* cited by examiner

Primary Examiner — George B Bennett

(57) ABSTRACT

The disclosure is an irregular object length measuring instrument, comprising a first fixing seat, at least two mounting flanges are provided on an edge of the first fixing seat, and a notch is provided on the first fixing seat, a shaft sleeve, the shaft sleeve is mounted on the mounting flange, a main board, a battery is installed on the main board, a gear and an angle sensor are installed on the main board, and the angle sensor is installed on the gear, a second fixing seat, an edge of the second fixing seat is provided with a matching flange that cooperates with the mounting flange, the second fixing seat is installed on the first fixing seat, and the main board is fixedly installed on the first fixing seat or the second fixing seat, a swivel, an outer side of the swivel is provided with a ring groove.

9 Claims, 7 Drawing Sheets

IRREGULAR OBJECT LENGTH MEASURING INSTRUMENT

CROSS-REFERENCES TO RELATED APPLICATIONS

This application claims the priority of Chinese patent application no. 202011560962.4, filed on Dec. 25, 2020, the entire contents of all of which are incorporated herein by reference.

FIELD OF THE DISCLOSURE

The present disclosure relates to the technical field of a measuring instrument, and more particularly, to an irregular object length measuring instrument.

BACKGROUND

Nowadays, for measuring objects with irregular surface shapes, it is usually measured by using a measuring ruler to wrap around the sticker, but it is more troublesome to use, especially the starting point is prone to offset in the course of winding and sticking, resulting in errors in the final measurement results, and once there are many irregularities for pressing and bonding, and the user cannot handle it alone.

Furthermore, there are many restrictions on the use of the ruler. When the measurement range exceeds the length of the ruler, it needs to be marked multiple times or replaced with a longer-length ruler. At the same time, storage is more troublesome.

Therefore, there is an urgent need for an irregular object length measuring instrument that can solve one or more of the above problems.

BRIEF SUMMARY OF THE DISCLOSURE

The technical problem to be solved in the disclosure, aiming at the defects of the prior art, provides an intelligent electronic lock.

In order to achieve the above said targets, the technical solution of the disclosure is as follows, an irregular object length measuring instrument comprises a first fixing seat, at least two mounting flanges are provided on an edge of the first fixing seat, and a notch is provided on the first fixing seat, a shaft sleeve, the shaft sleeve is mounted on the mounting flange, a main board, a battery is installed on the main board, a gear and an angle sensor are installed on the main board, and the angle sensor is installed on the gear, a second fixing seat, an edge of the second fixing seat is provided with a matching flange that cooperates with the mounting flange, the second fixing seat is installed on the first fixing seat, and the main board is fixedly installed on the first fixing seat or the second fixing seat, a swivel, an outer side of the swivel is provided with a ring groove, and other components.

BRIEF DESCRIPTION OF THE DRAWINGS

The following drawings are merely examples for illustrative purposes according to various disclosed embodiments and are not intended to limit the scope of the present disclosure.

REFERENCE SIGNS

Figure 1:
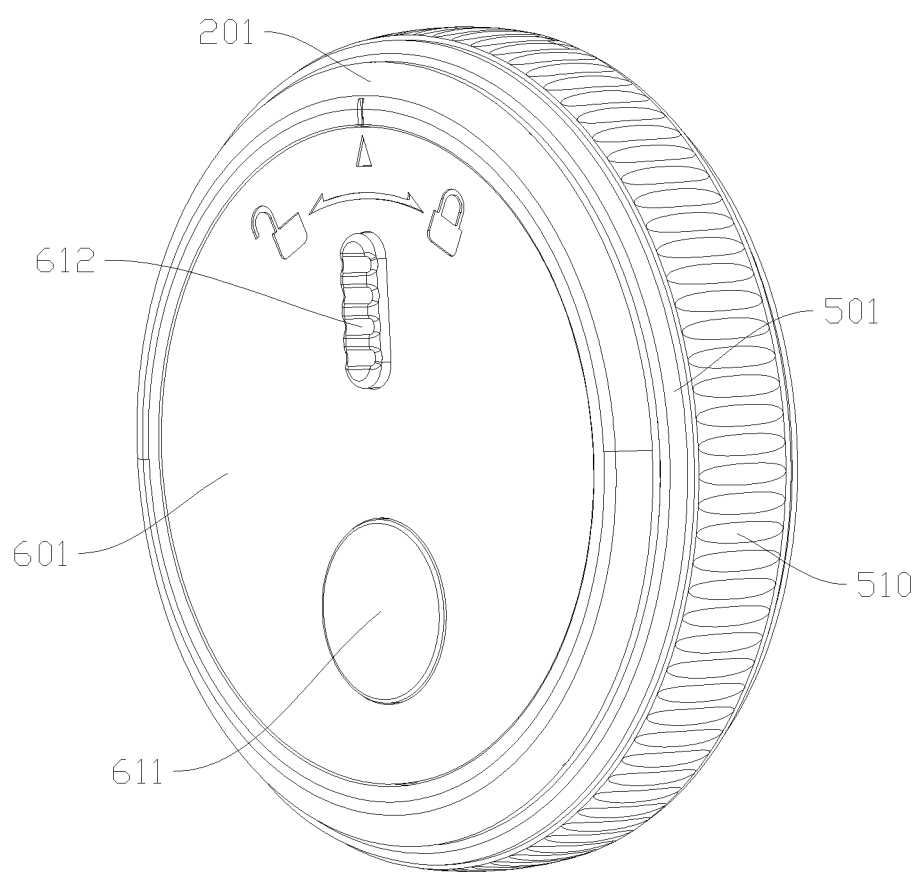
FIG. 1 illustrates a three-dimensional view of an irregular object length measuring instrument according to a disclosed embodiment.

101 . . . A first fixing seat
102 . . . A mounting flange
103 . . . A fixed notch
104 . . . A notch
105 . . . A reset notch
201 . . . A second fixing seat
202 . . . A battery fixing notch
203 . . . A matching flange
204 . . . A first gap
205 . . . A second gap
301 . . . A main board
302 . . . A battery
303 . . . A gear
304 . . . A USB interface
305 . . . An angle sensor
310 . . . A first button
311 . . . A second button
401 . . . A shaft sleeve
501 . . . A swivel
502 . . . A ring groove
503 . . . Internal teeth
504 . . . A rolling surface
510 . . . A friction ring
601 . . . A back cover
610 . . . A pressing plate
611 . . . An outer first button
612 . . . An outer second button
701 . . . A transparent cover
710 . . . A back glue
711 . . . A through groove
720 . . . A display screen.

DETAILED DESCRIPTION

In order to make the above objects, features and advantages of the disclosure more obvious and easier to understand, the following describes the specific implementation of the present disclosure in detail with reference to the drawings. In the following description, many specific details are set forth in order to fully understand the present disclosure. However, the present disclosure can be implemented in many other ways than those described here. Those skilled in the art can make similar improvements without violating the connotation of the present disclosure. Therefore, the present disclosure is not subject to limit.

As shown in FIGS. 1-7, the disclosure an irregular object length measuring instrument, which includes: a first fixing seat 101, at least two mounting flanges 102 are provided on the edge of the first fixing seat 101, the first fixing seat 101 is provided with a notch 104, A shaft sleeve 401, the shaft sleeve 401 is mounted on the mounting flange 102, A main board 301, a battery 302 is installed on the main board 301, a first button 310 and a second button 311 are arranged on the main board 301, a gear 303 and an angle sensor 305 are installed on the main board 301, and the angle sensor 305 is installed on the gear 303, A second fixing seat 201, the edge of the second fixing seat 201 is provided with a matching flange 203 that cooperates with the mounting flange 102, and the second fixing seat 201 is provided with a first gap 204 and a second gap 205 matched with the first button 310 and the second button 311, the second fixing seat 201 is mounted on the first fixing seat 101, and the main board 301 is fixedly mounted on the first fixing seat 101 or the second fixing seat 201, A swivel 501, an outer surface of the swivel 501 is provided with a ring groove 502, an inner surface of the swivel 501 is provided with internal teeth 503, the internal teeth 503 are matched with the gear 303, and the swivel 501 is rotatably mounted on the outer sides of the first fixing seat 101 and the second fixing seat 201, the shaft sleeve 401 abuts on the inner surface of the swivel 501, and the swivel 501 rotate with the shaft sleeve 401 as a stress point, A friction ring 510, the friction ring 510 is fixedly mounted on the ring groove 502, A display screen 720, the display screen 720 is mounted on the first fixing seat 101 and is electrically connected to the main board 301 through the notch 104, A transparent cover 701, the transparent cover 701 is fixedly installed on the first fixing seat 101 and covers the display screen 720, A back cover 601, the back cover 601 is provided with an outer first button 611 and an outer second button 612 that cooperate with the first button 310 and the second button 311, and the back cover 601 is fixedly installed on the second fixing seat 201.

It should be noted that the shaft sleeve 401 is installed on the mounting flange 102 and is fixed in position under the cooperation of the first fixing seat 101 and the second fixing seat 201. The shaft sleeve 401 protrudes from an outer side of the first fixing seat 101 and the second fixing seat 201 after being installed, so as to easily resist the swivel 501. The shaft sleeve 401 is generally sleeved with an elastic sleeve to facilitate the installation of the swivel 501 and increase friction. Generally, 20 or more Hall elements are arranged in the angle sensor 305 to improve the measurement accuracy. The connection and use methods of the main board 301, the display screen 720, and the angle sensor 305 are commonly used and general prior art, and will not be repeated here.

It should be pointed out that the rear cover 601 is rotatably clamped and mounted on the second fixing seat 201, and the first fixing seat 101 is provided with a reset notch 105, and the reset notch 105 is directly connected to the main board 301.

Figure 2:
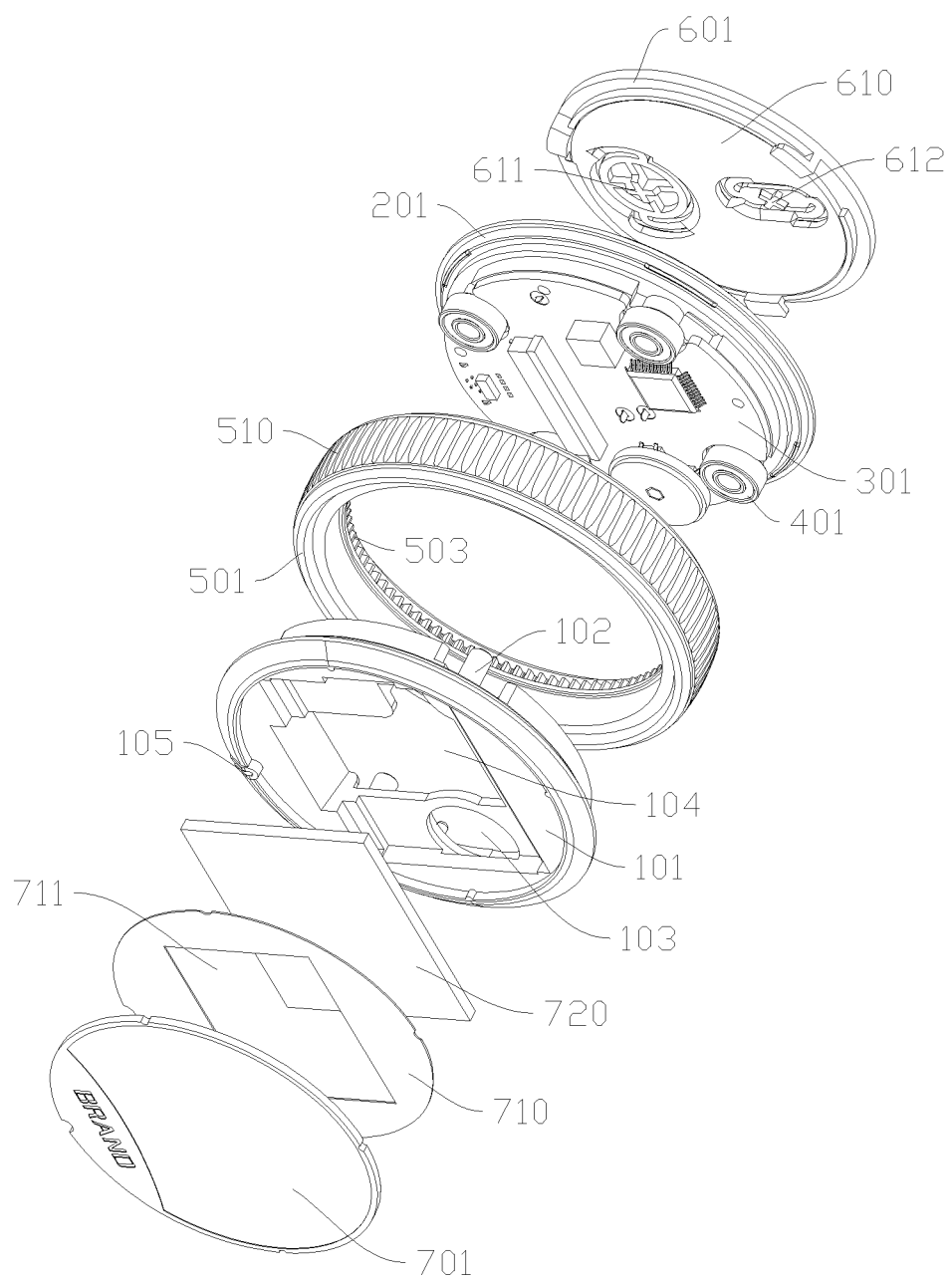
FIG. 2 illustrates an exploded view of the irregular object length measuring instrument according to the disclosed embodiment.
Figure 3:
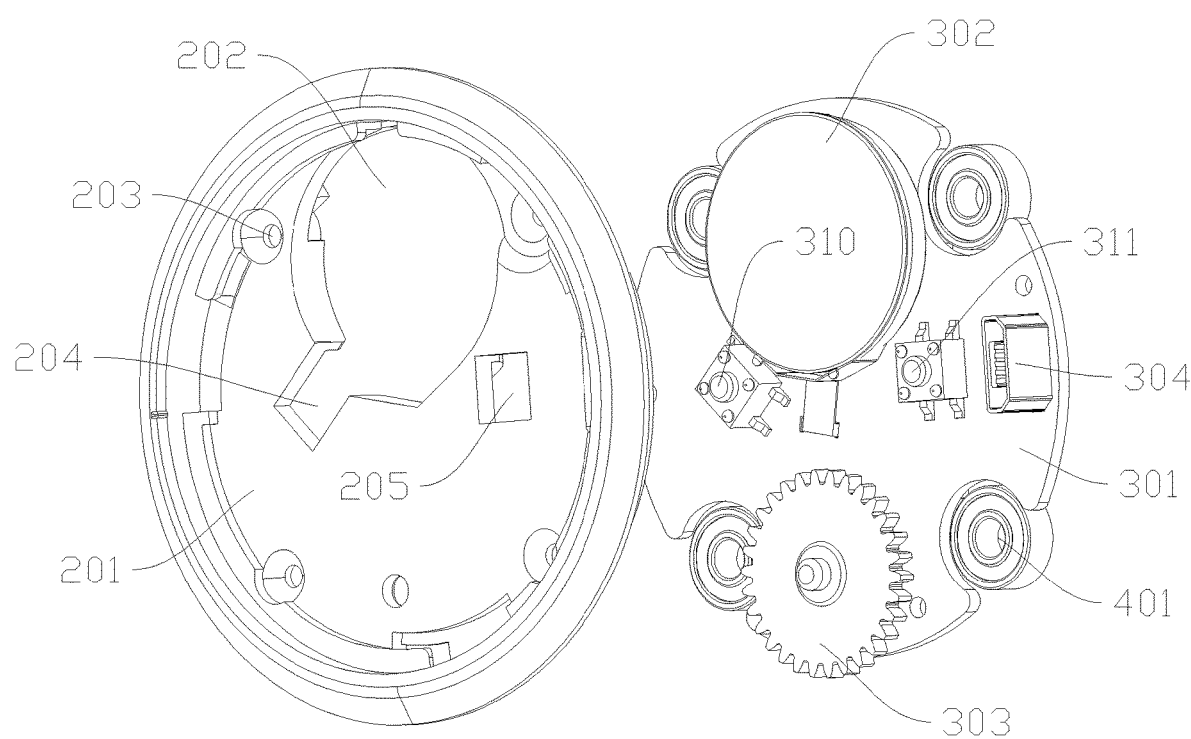
FIG. 3 illustrates a partial exploded view of the irregular object length measuring instrument according to the disclosed embodiment.
Figure 4:
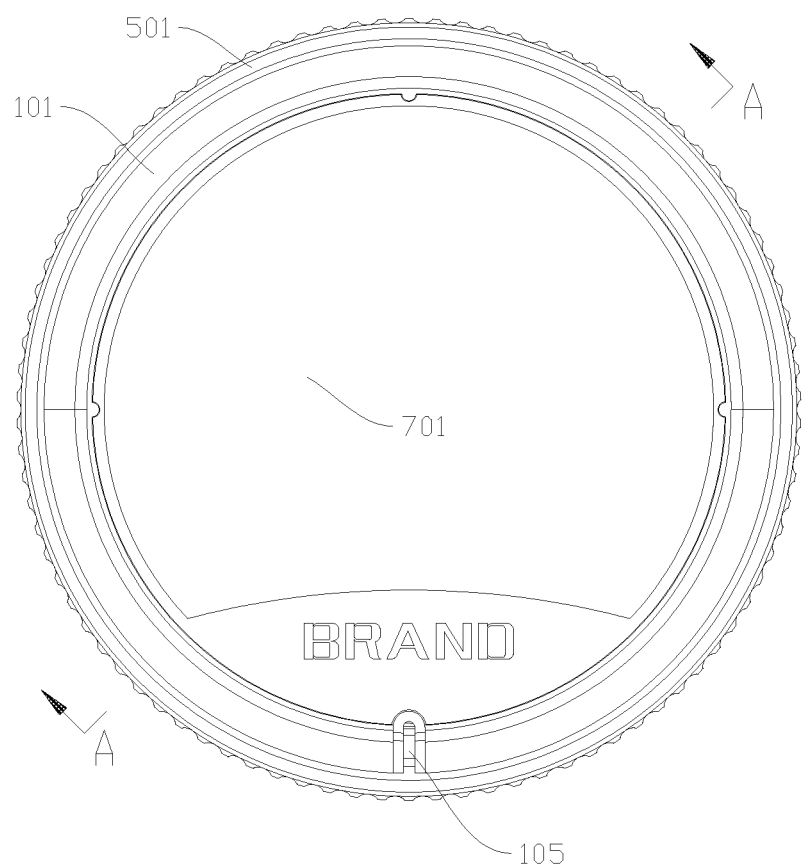
FIG. 4 illustrates a front view of the irregular object length measuring instrument according to the disclosed embodiment.
Figure 5:
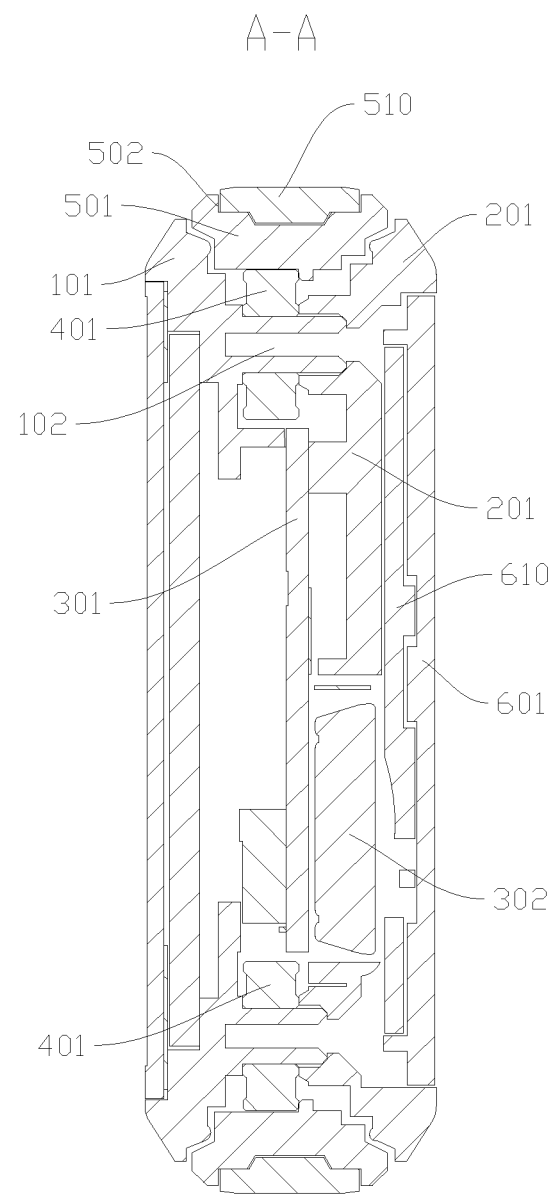
FIG. 5 illustrates a cross-sectional view along the A-A direction of the front view of the irregular object length measuring instrument according to the disclosed embodiment.

Specifically, as shown in FIGS. 2-4, the first fixing seat 101 is provided with a fixed notch 103, the fixed notch 103 is used to install the angle sensor 305, and the fixed notch 103 mainly holds the angle sensor 305 and the rotation fulcrum are provided. The rotation fulcrum of the gear 303 is arranged on the second fixing seat 201, and the angle sensor 305 and the gear 303 are generally arranged on the same rotating shaft or on the same axis. The second fixing seat 201 is provided with a battery fixing notch 202, and the battery fixing notch 202 is used to install the battery 302, the main board 301 is provided with a USB interface 304, and the USB interface 304 is connected to the second fixing seat 201 is on the same side. By turning and opening the back cover 601, the battery can be easily replaced and charged through the USB interface 304 or communicate with the main board 301.

Specifically, as shown in FIG. 2, the back cover 601 is provided with a pressing plate 610, and the outer first button 611 and the outer second button 612 are arranged on the pressing plate 610. It also includes a back glue 710, the back glue 710 is provided with a through groove 711, the through groove 711 is matched with the display screen 720, the back glue 710 is installed on the upper surface of the display screen 720 and is fixed by transparent cover 701.

Figure 6:
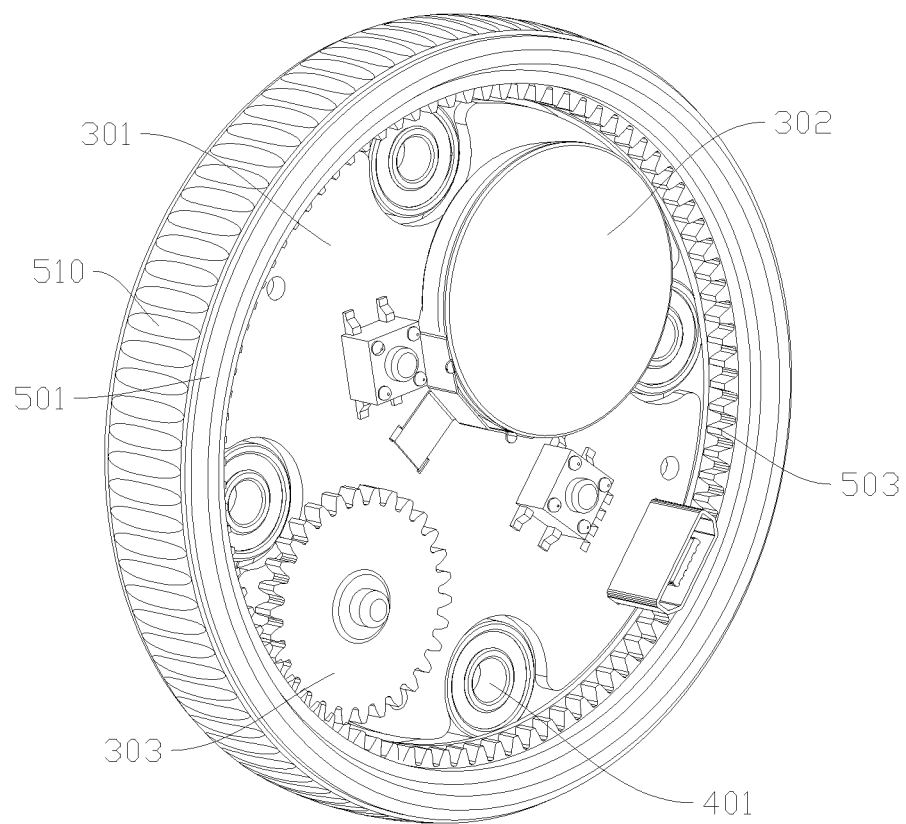
FIG. 6 illustrates a first partial view of the irregular object length measuring instrument according to the disclosed embodiment.
Figure 7:
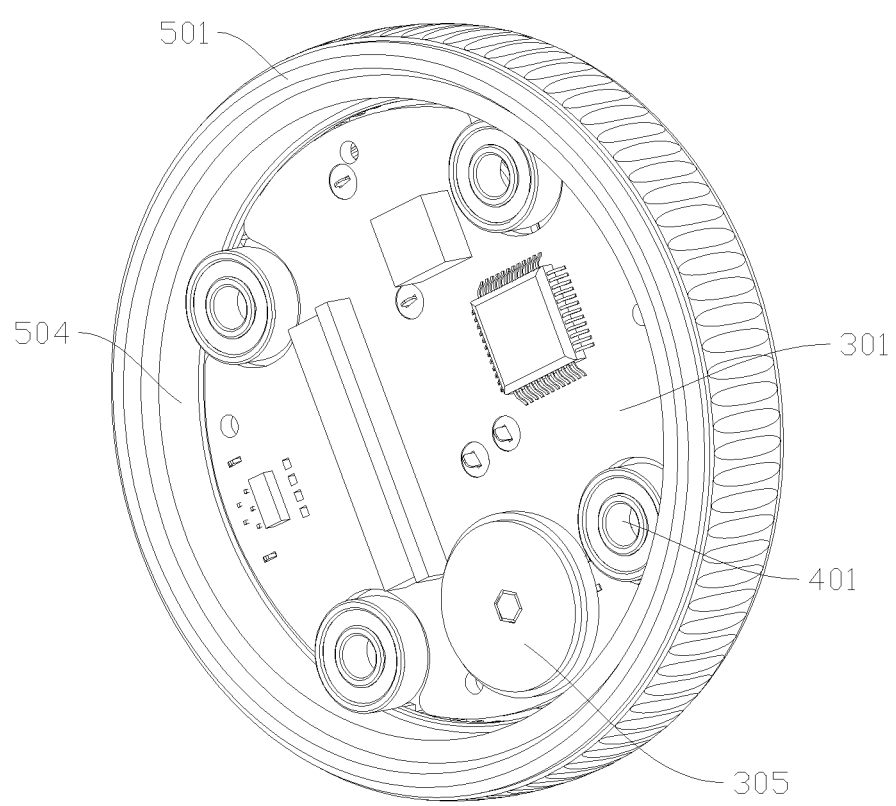
FIG. 7 illustrates a second partial view of the irregular object length measuring instrument according to the disclosed embodiment.

Specifically, as shown in FIGS. 6 and 7, there are four mounting flanges 102 and matching flange 203, four shaft sleeves 401 are provided, and the internal teeth 503 are provided on the lower end of the inner surface of the swivel 501, and the upper end of the inner surface of the swivel 501 is provided with a rolling surface 504 that matches with the shaft sleeve 401. In addition, the shaft sleeves 401 are arranged in a circular array and are arranged on the same horizontal plane.

The traditional rolling measuring instrument generally rotates around the central axis of the device, and the swivel of a single shaft sleeve and rotating shaft is prone to up and down deviation and rolling jam after long-term use. The stress in the rotation process is generally concentrated on a single shaft and sleeve, which is prone to damage, and the internal structure is complicated, replacement and maintenance are difficult, and the volume is large.

When in use, the friction ring 510 rolls on the surface of the object, thereby driving the swivel 501 to rotate. The swivel 501 drives the gear 303 to rotate through the internal teeth 503, and the angle sensor 305 is positioned on the number of turns and angles of rotation are recorded under the control of the main board 301, and output to the display screen 720. The measurement is controlled by using the first button 310 or the second button 311, such as resetting to zero, setting the starting point, and setting interruption. Point, set the end point and record data, etc. Compared with the traditional measuring instrument that rotates around the axis of the device, the structure is simpler and more concise, and the position restriction of the internal components is also smaller. At the same time, because of the four shaft sleeves 401, the structure is more stable and no aluminum alloy is needed to make the swivel 501, and the turbulence during the rotation will not cause the internal gears, sensors and other components to shift, the impact force received is absorbed by the four shaft sleeves 401, and the swivel 501 rotates smoothly and will not shift up and down under long-term use at the same time.

To sum up, the present disclosure uses the first fixing seat 101, the second fixing seat 201, the main board 301, the shaft sleeve 401, the display screen 720 and other components connected together through a clever structure to achieve stable and rapid measurement of the length of the surface of the object by rolling the swivel. With the cooperation of multiple shaft sleeves, the swivel rolls more smoothly, and the stability and stability of the overall structure are improved. The accuracy of the measurement enables the friction ring or the swivel ring to be made of plastic material to reduce cost and weight, and multiple buttons are used to control the measurement, and the display screen is used to intuitively output the measured information. The above greatly improves the use value of the disclosure.

The above-mentioned embodiments only express one or more embodiments of the disclosure, and their descriptions are more specific and detailed, but they should not be interpreted as limiting the scope of the disclosure. It should be noted that for those of ordinary skill in the art, without departing from the concept of the disclosure, several modifications and improvements can also be made, which all fall within the protection scope of the disclosure. Therefore, the protection scope of the disclosure shall be subject to the appended claims.

What is claimed is:

1. An irregular object length measuring instrument, comprising,
   a first fixing seat, at least two mounting flanges are provided on an edge of the first fixing seat, and a notch is provided on the first fixing seat,
   a shaft sleeve, the shaft sleeve is mounted on the mounting flange,
   a main board, a battery is installed on the main board, a gear and an angle sensor are installed on the main board, and the angle sensor is installed on the gear,
   a second fixing seat, an edge of the second fixing seat is provided with a matching flange that cooperates with the mounting flange, the second fixing seat is installed on the first fixing seat, and the main board is fixedly installed on the first fixing seat or the second fixing seat,
   a swivel, an outer side of the swivel is provided with a ring groove, an inner side of the swivel is provided with internal teeth, the internal teeth are matched with the gear, and the swivel is rotatably mounted on the first fixing seat and an outer side surface of the second fixing seat, the shaft sleeve abuts on an inner side surface of the swivel, and the swivel rotates with the shaft sleeve as a stress point,
   a friction ring, the friction ring is fixedly mounted on the ring groove,
   a display screen, the display screen is mounted on the first fixing seat and is electrically connected to the main board through the notch,
   a transparent cover, the transparent cover is fixedly installed on the first fixing seat and covers the display screen,
   a back cover, the back cover is fixedly installed on the second fixing seat.

2. The irregular object length measuring instrument according to claim 1, wherein a fixed notch is provided on the first fixing seat, and the fixed notch is used for installing the angle sensor.

3. The irregular object length measuring instrument according to claim 1, wherein the second fixing seat is provided with a battery fixing notch, and the battery fixing notch is used for installing the battery.

4. The irregular object length measuring instrument according to claim 1, wherein a USB interface is provided on the main board, and the USB interface is on the same side as the second fixing seat.

5. The irregular object length measuring instrument according to claim 1, wherein the main board is provided with a first button and a second button, and the second fixing seat is provided with a first gap and a second gap matched for the first button and the second button, and the back cover is provided with an outer first button and an outer second button that are matched with the first button and the second button.

6. The irregular object length measuring instrument according to claim 5, wherein a pressing plate is arranged in the back cover, and the outer first button and the outer second button are arranged on the pressing plate.

7. The irregular object length measuring instrument according to claim 1, further comprising a back glue, the back glue is provided with a through groove, the through groove is matched with the display screen, the back glue is installed on an upper surface of the display screen and is fixed by the transparent cover.

8. The irregular object length measuring instrument according to claim 1, wherein there are four the mounting flanges and four the matching flanges, and four the shaft sleeves, and the inner teeth are arranged at a lower end of the inner surface of the swivel ring, and an upper end of the inner surface of the swivel ring is provided with a rolling surface matched with the shaft sleeve.

9. The irregular object length measuring instrument according to claim 7, wherein the shaft sleeve is arranged in a circular array and are arranged on the same horizontal plane.

* * * * *